United States Patent
Sato et al.

(10) Patent No.: US 8,333,882 B2
(45) Date of Patent: Dec. 18, 2012

(54) POLISHING APPARATUS AND METHOD OF POLISHING WORK

(75) Inventors: Unkai Sato, Nagano (JP); Koichiro Ichikawa, Nagano (JP); Yoshinobu Nishimoto, Nagano (JP); Yoshio Nakamura, Nagano (JP); Tsuyoshi Hasegawa, Nagano (JP); Masumi Iihama, Nagano (JP)

(73) Assignee: Fujikoshi Machinery Corp., Nagano (JP)

( * ) Notice: Subject to any disclaimer, the term of this patent is extended or adjusted under 35 U.S.C. 154(b) by 981 days.

(21) Appl. No.: 11/598,789

(22) Filed: Nov. 14, 2006

(65) Prior Publication Data

US 2007/0108067 A1    May 17, 2007

(30) Foreign Application Priority Data

Nov. 15, 2005  (JP) ................................. 2005-330362
Oct. 16, 2006  (JP) ................................. 2006-280840

(51) Int. Cl.
    *C25F 3/30*    (2006.01)
(52) U.S. Cl. ......................................... 205/674; 216/99
(58) Field of Classification Search .................. 205/674; 216/99
    See application file for complete search history.

(56) References Cited

U.S. PATENT DOCUMENTS

| | | | |
|---|---|---|---|
| 5,635,053 A | 6/1997 | Aoki et al. | |
| 5,735,729 A | 4/1998 | Kobayashi et al. | |
| 5,861,054 A | 1/1999 | Miyashita et al. | |
| 5,876,273 A * | 3/1999 | Yano et al. | 451/288 |
| 5,922,620 A | 7/1999 | Shimomura et al. | |
| 6,667,238 B1 | 12/2003 | Kimura et al. | |

FOREIGN PATENT DOCUMENTS

| | | |
|---|---|---|
| EP | 0 637 619 A1 | 2/1995 |
| EP | 0 773 269 A2 | 5/1997 |
| EP | 1 074 343 A1 | 2/2001 |
| GB | 2-294-590 A | 5/1996 |
| JP | 3-281165 A | 12/1991 |
| JP | 07-075784 A | 3/1995 |
| JP | 07-254578 A | 10/1995 |
| JP | 8-339981 A | 12/1996 |
| JP | 08339981 A * | 12/1996 |
| JP | 10-324865 A | 12/1998 |
| JP | 2000049125 A * | 2/2000 |
| JP | 2002-167594 A | 6/2002 |
| JP | 2002167594 A * | 6/2002 |
| JP | 2002252189 A * | 9/2002 |
| JP | 2004-335896 A | 11/2004 |
| WO | 2004/058450 A1 | 7/2004 |

OTHER PUBLICATIONS

Jones, "Principles and Prevention of Corrosion," Prentice Hall, Upper Saddle River, NJ, 1996, pp. 51 and 66.*

* cited by examiner

*Primary Examiner* — Nicholas A. Smith
(74) *Attorney, Agent, or Firm* — Birch, Stewart, Kolasch & Birch, LLP

(57) ABSTRACT

The method of polishing a work is capable of reducing a polishing cost, polishing a surface of the work with high polishing accuracy and easily disposing used polishing liquid and used washing liquid. The method comprises the steps of: pressing the work onto a polishing member; feeding polishing liquid; and relatively moving the work with respect to the polishing member. Electrolytic reduced water produced by electrolyzing an electrolyte solution is used as the polishing liquid.

9 Claims, 7 Drawing Sheets

POLISHING APPARATUS AND METHOD OF POLISHING WORK

BACKGROUND OF THE INVENTION

The present invention relates to an apparatus for polishing a work and a method of polishing a work, more precisely relates to an apparatus for polishing a work and a method of polishing a work, in each of which electrolytic reduced water is used.

A surface of a work, e.g., silicon wafer, is polished in a single stage or multiple stages to perform a rough polish process, a moderate polish process and a finishing polish process with using specified polishing liquid. Abrasive grains, e.g., colloidal silica, chemical agents, etc. are added to the polishing liquid (see Japanese Patent Kokai Gazette No. 3-281165). After completing a polishing step including said processes, the polished work is cleaned so as to remove fine particles and ion residual dross stuck on the surface of the work.

However, the polishing method using the above described polishing liquid has following problems: (1) the polishing liquid, especially the polishing liquid for the finishing polish process is expensive; (2) the fine particles and the ion residual dross in the polishing liquid stick onto the surface of the work, so a cleaning step must be required and a cost for polishing the work must be increased; (3) the fine particles exist on the surface of the work, so polishing accuracy of a finishing step must be limited; and (4) costs for treating the used polishing liquid and the used washing liquid must be high.

SUMMARY OF THE INVENTION

The present invention was conceived to solve the above described problems.

An object of the present invention is to provide a method of polishing a work and a work polishing apparatus, in each of which electrolytic reduced water is used and each of which is capable of reducing a polishing cost, polishing a surface of the work with high polishing accuracy and easily disposing used polishing liquid and used washing liquid.

To achieve the object, the present invention has following structures.

Namely, the method of polishing a work comprises the steps of: pressing the work onto a polishing member; feeding polishing liquid; and relatively moving the work with respect to the polishing member, and electrolytic reduced water, which is produced by electrolyzing an electrolyte solution, is used as the polishing liquid.

The method may further comprise the step of removing an oxide film formed on a surface of the work, and the work may be polished with feeding the electrolytic reduced water as the polishing liquid after removing the oxide film.

In the method, an electrolyzed water producing section may continuously produce the electrolytic reduced water by electrolyzing the electrolyte solution and feeds the same as the polishing liquid.

The method may further comprise the step of cleaning the polished work with washing water.

In the method, the washing water may be electrolytic oxidized water or the electrolytic reduced water, which is produced by electrolyzing an electrolyte solution.

In the method, an electrolyzed water producing section may continuously produce the electrolytic oxidized water or the electrolytic reduced water by electrolyzing the electrolyte solution and feeds the same as the washing water.

In the method, oxidation-reduction potential of the electrolytic reduced water may be −800 to −900 mV with respect to a silver-silver chloride electrode used as a comparative electrode.

In the method, the work may be roughly polished at the beginning of a polishing step, moderately polished at the midpoint of the polishing step and precisely polished at the final stage of the polishing step, and the method may be used for moderately and precisely polishing the work.

The method is capable of suitably polishing one or both surfaces, an outer circumferential part and/or an inner circumferential part of the work.

The method is capable of suitably polishing a silicon wafer.

The polishing apparatus of the present invention comprises:

an electrolyzed water producing section electrolyzing an electrolyte solution;

a polishing section pressing a work onto a polishing member and relatively moving the work with respect to the polishing member so as to polish the work; and a polishing liquid feeding section feeding electrolytic reduced water, which is produced by the electrolyzed water producing section, to the polishing section.

The apparatus may further comprise a washing water feeding section feeding electrolytic oxidized water or electrolytic reduced water, which is produced by the electrolyzed water producing section, as washing water.

In the apparatus, the electrolyzed water producing section may be a three-tank electrolyzed water producing unit, in which an anode electrolyzing tank, an electrolyte solution tank and a cathode electrolyzing tank are mutually separated by separating membranes and arranged in that order.

Polishing liquid for polishing the work is produced by electrolyzing an electrolyte solution.

In the polishing liquid, oxidation-reduction potential of the liquid may be −800 to −900 mV with respect to a silver-silver chloride electrode used as a comparative electrode.

By employing the method and the apparatus of the present invention, a cost of polishing the work can be reduced, the surface of the work can be polished with high polishing accuracy, and the used polishing liquid and the used washing liquid can be easily disposed.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
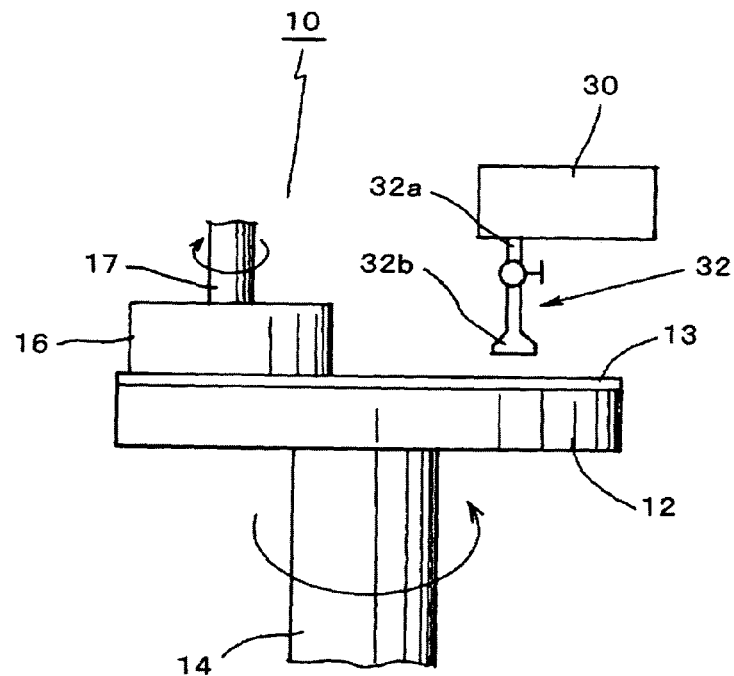
FIG. 1 is an explanation view of a polishing apparatus for polishing one side surface of a silicon wafer.

FIG. 1 is an explanation view of a polishing apparatus 10, which is an example of polishing apparatuses of the present invention and which is capable of polishing one side surface of a work.

A polishing section of the apparatus 10 is publicly known, so it will be briefly explained.

In FIG. 1, a polishing pad (polishing member) 13, e.g., polyurethane pad, is adhered on an upper face of a polishing plate 12 by, for example, adhesive. The polishing plate 12 is rotated, in a horizontal plane, by a spindle 14. The spindle 14 is rotated by a known driving mechanism (not shown).

A wafer (work) holding head 16 is rotated about its axial line by a known mechanism and attached to a lower end of a rotary shaft 17, which can be moved upward and downward. The wafer holding head 16 is moved upward and downward by, for example, a cylinder unit.

Figure 2:
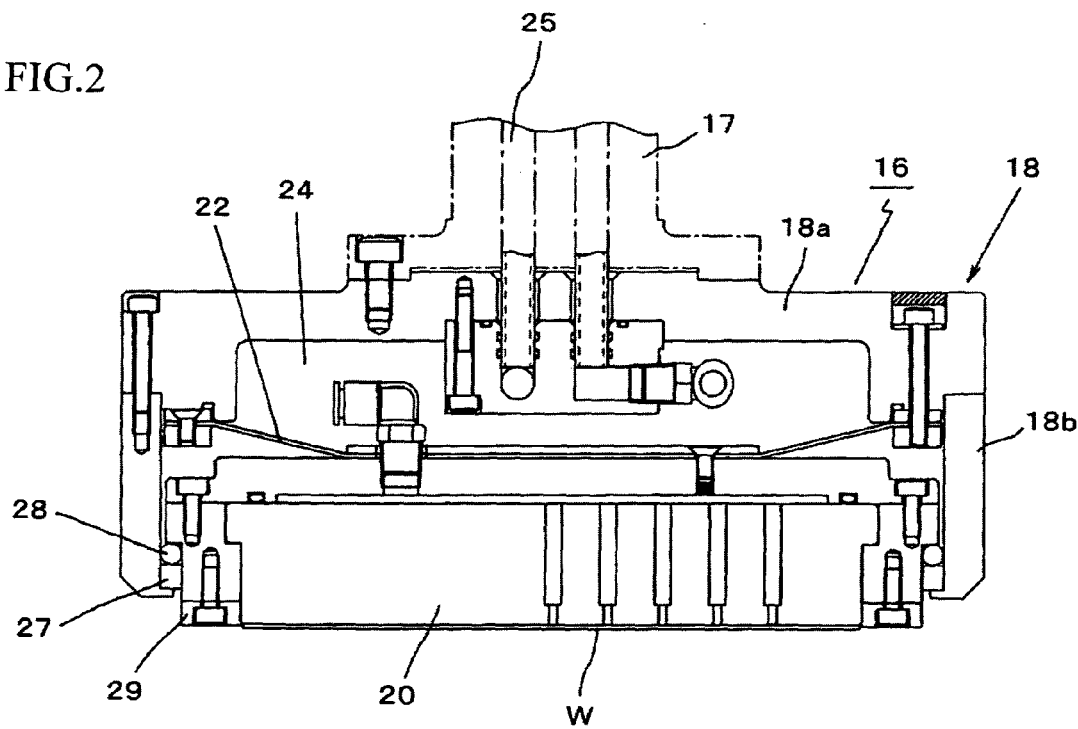
FIG. 2 is a sectional view of a wafer holding head.

FIG. 2 is a sectional view of the wafer holding head 16.

A main body 18 has a ceiling part 18a, a side wall part 18b and a concave part, whose lower face is opened. A carrier 20 is provided in the concave part of the main body 18. The carrier 20 is suspended by an elastic diaphragm 22, whose outer circumferential part is fixed to an inner part of the main body 18 and whose inner circumferential part is fixed to an upper face of the carrier 20. Since the diaphragm 22 is flexible, the carrier 20 can be moved upward and downward. Further, torque of the shaft 17 is transmitted to the carrier 20 by the main body 18 and the diaphragm 22, so that the carrier 20 is rotated together with the main body 18.

A pressure chamber 24, which is closed by the diaphragm 22, is formed in the main body 18. Pressurized fluid, e.g., compressed air, is introduced into the pressure chamber 24 from a fluid source (not shown) via a rotary joint and a flow path 25 formed in the shaft 17.

A stopper ring 27 is provided on the inner side of the side wall part 18b of the main body 18 so as to prevent the carrier 20 from detaching therefrom and guide the up-down movement of the carrier 20. An O-ring 28 is provided between an inner face of the side wall part 18b and an outer face of the carrier 20 so as to absorb horizontal movement of the carrier 20 and prevent polishing liquid from invading into the main body 18.

When a silicon wafer (work) W to be polished is set, the silicon wafer W is held on a lower face of the carrier 20, which is located above the polishing plate 12, and a surface to be polished faces the polishing plate 12. In the present embodiment, a vacuum sucking force is applied to the silicon wafer W via the pressure chamber 24 and the carrier 20 so as to suck and hold the silicon wafer W on the lower face of the carrier 20. The silicon wafer W may be directly held on the lower face of the carrier 20 or held on a backing member (not shown) adhered on the lower face of the carrier 20. When the silicon wafer W is polished, the suction is stopped and inner pressure of the pressure chamber 24 is increased so as to press the silicon wafer W onto the polishing pad 13, with a prescribed pressing force, together with the carrier 20.

In another case, the silicon wafer W may be adhered and held on the backing member 20a, which has been adhered on the lower face of the carrier 20, by water.

Note that, a template 29 encloses the silicon wafer W, which is held on the lower face of the carrier 20, so as to prevent the silicon wafer W from moving outward.

The polishing section is constituted by the polishing plate 12, the wafer holding head 16, etc.

In FIG. 1, a symbol 30 stands for an electrolyzed water producing section.

The electrolyzed water producing section 30 electrolyzes an electrolyte solution so as to produce electrolyzed water. Note that, the word "electrolyte solution" includes a solution of an electrolyte salt. In the present invention, electrolytic reduced water (alkaline liquid) of the electrolyzed water is fed to the polishing pad 13 via an electrolyzed water feeding section 32, which has a feeding pipe 32a and a nozzle 32b, while polishing the silicon wafer W.

Figure 3:
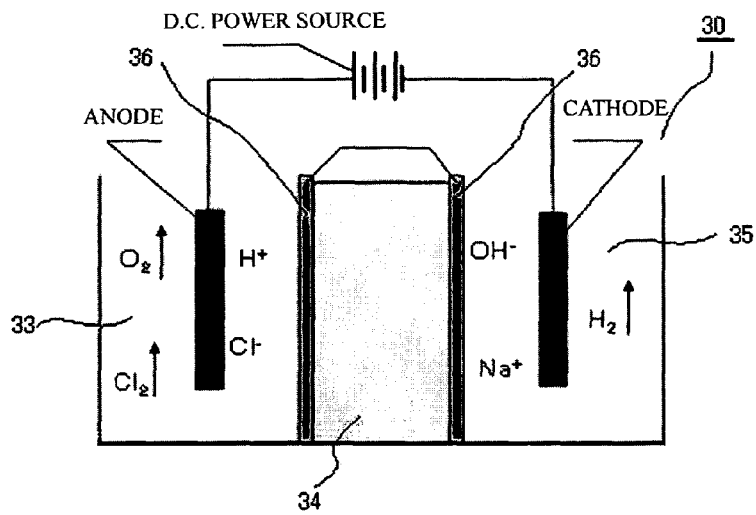
FIG. 3 is an explanation view of a three-tank electrolyzed water producing unit.

FIG. 3 is an explanation view of the three-tank electrolyzed water producing section 30. In the electrolyzed water producing section 30, an anode electrolyzing tank (anode tank) 33, an electrolyte solution tank 34 and a cathode electrolyzing tank (cathode tank) 35 are mutually separated by separating membranes 36 and arranged in that order.

An electrolyte solution is stored in the electrolyte solution tank 34, the electrolyte solution tank 34 is communicated with a tank (not shown) via a circulation pipe, and the electrolyte solution is circulated by a circulation pump so as to reuse. In the present embodiment, a solution of an electrolyte salt is used as the electrolyte solution, so the solution of the electrolyte salt is stored in the electrolyte solution tank 34. Note that, the word "electrolyte solution" includes an aqueous solution of an electrolyte, e.g., NaOH.

Pure water or tap water is continuously supplied into the anode electrolyzing tank 33 and the cathode electrolyzing tank 35 and electrolyzed therein. Therefore, electrolytic oxidized water (acid liquid) can be continuously produced in the anode electrolyzing tank 33; the electrolytic reduced water (alkaline liquid) can be continuously produced in the cathode electrolyzing tank 35.

Unlike a two-tank electrolyzed water producing section, no electrolyte salt is directly supplied into the electrolyzing tanks of the three-tank electrolyzed water producing section 30. Therefore, positive ion concentration of the electrolyte in the electrolytic reduced water is low, and negative ion concentration of the electrolyte in the electrolytic oxidized water is also low.

In the present invention, the electrolytic reduced water is used as polishing liquid. Positive ion concentration of the electrolyte salt, e.g., sodium ion concentration, in the electrolytic reduced water, which is produced in the three-tank electrolyzed water producing section 30, is low, e.g., 0.005-0.04 wt %. Since the positive ion concentration is low, fewer positive ions stick onto a surface of the silicon wafer, so that the polished silicon wafer can be easily cleaned and surface quality of the polished silicon wafer is not badly influenced.

Note that, in the present invention, the electrolyzed water producing section 30 is not limited to the three-tank type. Electrolytic reduced water produced by a two-tank or one-tank type producing unit may be used as polishing liquid.

The electrolyte salt solution may include an electrolyte salt, e.g., NaCl, KCl, $Na_2SO_4$, $K_2CO_3$, $NaNO_3$, $K_2SO_4$, $(NH_4)_2CO_3$.

In the present embodiment, the electrolyzed water producing section 30 is capable of continuously producing 2-3 liters of electrolytic reduced water a minute. The electrolyzed water producing section 30 is located in the vicinity of the polishing section, and the electrolyzed water producing section 30 continuously produces and feeds the electrolytic reduced water so as to polish the silicon wafer.

Note that, the electrolytic reduced water may be previously produced and stored, and the stored electrolytic reduced water may be fed as polishing liquid when the silicon wafer is polished.

A polishing power of the above described electrolytic reduced water with respect to oxide film formed on silicon is low.

When the silicon wafer, whose surface is covered with oxide film, is roughly polished at the beginning of the polishing step, the silicon wafer is polished with ordinary polishing liquid including abrasive grains. At the mid point and the final stage of the polishing step, the electrolytic reduced water can be used as polishing water for moderately polishing and precisely polishing the silicon wafer, from which the oxide film has been removed. Note that, if no oxide film exists on the silicon wafer at the beginning of the polishing step, the electrolytic reduced water may be used instead of the ordinary polishing liquid.

The electrolytic reduced water has enough polishing rates for the moderate and precise polish processes, and no abrasive grains are included therein. Therefore, the silicon wafer can be moderately and precisely polished, with prescribed polishing accuracy, without damaging the surface thereof.

The electrolytic reduced water has strong alkalinity, e.g., about pH 11. For example, polishing rate of an alkaline solution of NaOH, whose pH value is about 11, to the silicon wafer is lower than that of the electrolytic reduced water of the present embodiment. The reason is a difference of oxidation-reduction potential (ORP) therebetween. The ORP of the electrolytic reduced water with respect to a comparative electrode (silver-silver chloride electrode) is a great minus value, e.g., about −850 mV. Therefore, a great power for etching the surface of the silicon wafer can be gained.

When the electrolytic reduced water is produced on the cathode side, a hydrogen gas is generated from the cathode. Since the hydrogen gas is included in the electrolytic reduced water, the ORP is made low, oxidizing the surface of the silicon wafer is restrained. Therefore, pure silicon, which is weak and can be easily etched, is always exposed, so that high polishing rate can be gained. The suitable ORP of the electrolytic reduced water is −900 to −800 mV. If the ORP is higher than −800 mV, the polishing rate is made lower; if the ORP is lower than −900 mV, an electric current higher than 30 A must be used so that a cost must be increased.

Note that, ORP of the NaOH solution is a small plus value, e.g., +4 mV; ORP of $H_2O$ is a great plus value, e.g., +310 mV. Therefore, polishing rate must be low.

By continuously supplying pure water or tap water to the anode electrolyzing tank 33 and the cathode electrolyzing tank 35 and electrolyzing the water therein, concentration of the electrolyte salt in the electrolyte solution tank 34 is gradually reduced. By reducing the concentration of the electrolyte salt in the electrolyte solution tank 34, characteristics of the electrolyzed water are changed. For example, the pH value of the electrolytic reduced water is reduced, a numerical value of the ORP is reduced and the ion concentration is made lower. If said values are too small, the polishing power must be lowered. Therefore, the electrolyte salt is supplemented into the electrolyte solution tank 34 with checking the characteristics of the electrolyzed water.

Unlike alkalinity and acidity of chemical agents, alkalinity of the electrolytic reduced water and acidity of the electrolytic oxidized water defined by bias of $H^+$ ions and $OH^-$ ions caused by electrolyzing water. The electrolyzed water does not badly influence human bodies. By mixing the electrolytic reduced water and the electrolytic oxidized water, the original water is reproduced. Therefore, the used water can be easily disposed without any treatment. Namely, the electrolyzed water is safe and environment-friendly liquid.

After the silicon wafer is completely polished, the silicon wafer is cleaned with washing water. By polishing with the electrolytic reduced water, fewer substances stick on the silicon wafer so that the silicon wafer can be easily cleaned. The electrolytic oxidized water produced in the anode tank 33 of the electrolyzed water producing section 30 may be used as the washing water instead of pure water. In the present embodiment, the electrolytic reduced water produced in the cathode tank 35 is used as polishing liquid; the electrolytic oxidized water produced in the anode tank 33 is fed to the cleaning section (not shown), which is located in the vicinity of the polishing section, via a washing water supply section (not shown) including a feeding pipe, etc. as washing water. Both of the electrolytic reduced water and the electrolytic oxidized water can be efficiently used. Further, neutralizing treatment can be performed by mixing the used both waters, so that the used waters can be easily disposed.

Further, the electrolytic reduced water may be used as the washing water.

In the above described embodiment, the polishing apparatus polishes one side surface of the silicon wafer. The present invention can be applied to a polishing apparatus capable of polishing both side surfaces of a work.

For example, the polishing apparatus (not shown), which is capable of polishing both side surfaces of a work, comprises: an upper polishing plate and a lower polishing plate, which are rotated in the opposite directions and in each of which a polishing pad is adhered on a polishing face; and a carrier for holding the work between the upper and lower polishing plates. The carrier has a work hole and is engaged with a sun gear and an internal gear so as to rotate and circularly move the work. In another apparatus, the carrier is circularly moved, by a crank mechanism, without rotating.

In the polishing apparatus capable of polishing both side surfaces of a work too, the electrolytic reduced water can be used as polishing liquid.

Further, the present invention can be applied to a polishing apparatus capable of mirror-polishing not only the surface of the silicon wafer but also an outer circumferential part of the silicon wafer including an outer edge, an outer circumferential face, a notch part, an orientation flat, etc.

In the above described polishing apparatus, a polishing member is adhered on an outer circumferential face or an inner circumferential face of a cylindrical body. By pressing the outer circumferential part of the silicon wafer onto the polishing member adhered to the rotating cylindrical body, the outer circumferential part can be mirror-polished. The above described electrolytic reduced water is fed as polishing liquid.

In case of polishing an outer circumferential part and an inner circumferential part of a donut-shaped work too, the above described electrolytic reduced water can be fed as polishing liquid.

In the above described embodiments, the silicon wafer is polished as the work. The work is not limited to the silicon wafer. Other works, e.g., metal film, plastic layer, compound semiconductor film, glass, ceramic, may be polished with the above described electrolytic reduced water.

EXAMPLES

The electrolyzed water producing unit shown in FIG. 3 was used. Pure water was continuously supplied into the anode tank 33 and the cathode tank 35 and electrolyzed therein. Flow volume of the pure water was 2.51 liters a minute, applied voltage was 15 V and electric current was 30 A. An electrolyte salt solution in the electrolyte solution tank 34 was circulated. Characteristics of electrolytic reduced waters (pH value, ORP and electric conductivity) are shown in TABLE 1. Note that, "NALCO 2371" is commercially produced polishing liquid. According to TABLE 1, the pH values of the electrolytic reduced waters were about 11, and the ORP thereof were about −850 mV. The ORP values were quite different from that of the commercially produced polishing liquid and a caustic soda aqueous solution.

TABLE 1

| ELECTROLYTIC REDUCED WATER | pH | ORP (mV) | ELECTRIC CONDUCTIVITY (S/m) |
|---|---|---|---|
| KCL | 11.35 | −846 | 0.205 |
| $Na_2SO_4$ | 11.10 | −843 | 0.167 |
| $K_2CO_3$ | 11.09 | −848 | 0.188 |
| $NaNO_3$ | 11.19 | −848 | 0.167 |
| $K_2SO_4$ | 11.22 | −857 | 0.179 |
| $\{NH_4\}_2CO_3$ | 10.49 | −795 | 0.034 |
| NaCl | 11.60 | −890 | 0.293 |
| NALCO 2371 | 10.64 | −34 | 0.177 |
| NaOH | 12.29 | 4 | |
| $H_2O$ | 6.47 | 39 | 0.002 |

Figure 4:
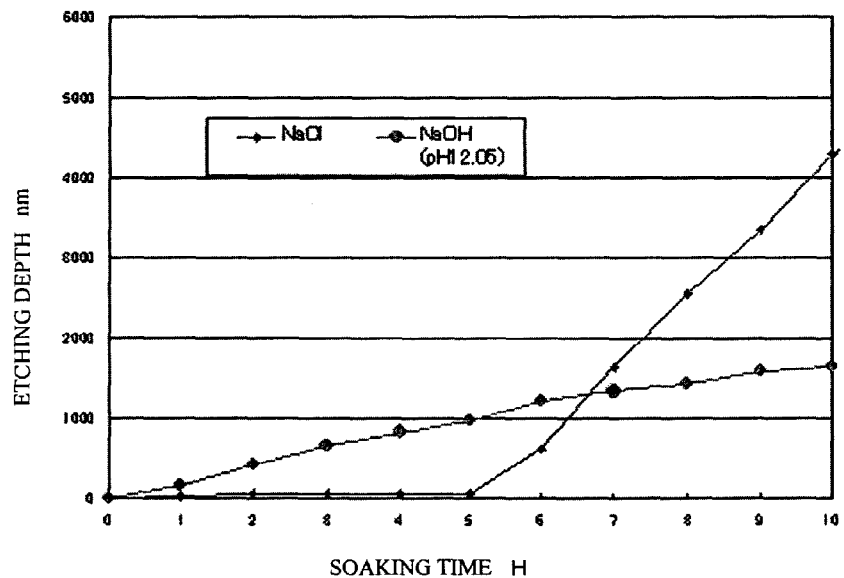
FIG. 4 is a graph showing etching function of electrolytic reduced water.

FIG. 4 is a graph showing etching function of the electrolytic reduced water (electrolyte salt: NaCl) and a NaOH aqueous solution (pH: 12.05). Silicon wafers, whose surfaces were covered with oxide films, were soaked in the electrolytic reduced water and the NaOH aqueous solution, and etching depth of the both silicon wafers with respect to soaking time were measured. According to FIG. 4, the etching function of the NaOH aqueous solution was almost constant. On the other hand, the electrolytic reduced water showed little etching function until about five hours; after a lapse of five hours, etching rate of the electrolytic reduced water exceeded that of the NaOH aqueous solution. Therefore, the etching function of the electrolytic reduced water to the oxide film was low. After a lapse of five hours, the oxide film was removed so that the etching rate was increased. Namely, the electrolytic reduced water can be suitably used as polishing liquid for polishing silicon wafers.

Figure 5:
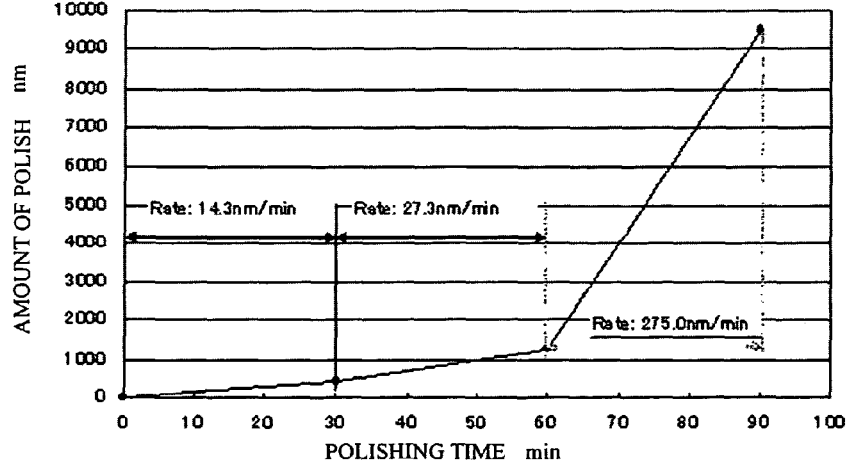
FIG. 5 is a graph showing a relationship between polishing time and amount of polish in a moderate polish process with the electrolytic reduced water.

FIG. 5 is a graph showing a relationship between polishing time and amount of polishing a silicon wafer (unit: nm), whose surface was covered with oxide film. The silicon wafer was polished with the electrolytic reduced water (electrolyte salt: NaCl).

According to FIG. 5, polishing rate was low until 60 minutes. After a lapse of 60 minutes, the oxide film was removed so that the polishing rate was highly increased.

Figure 6:
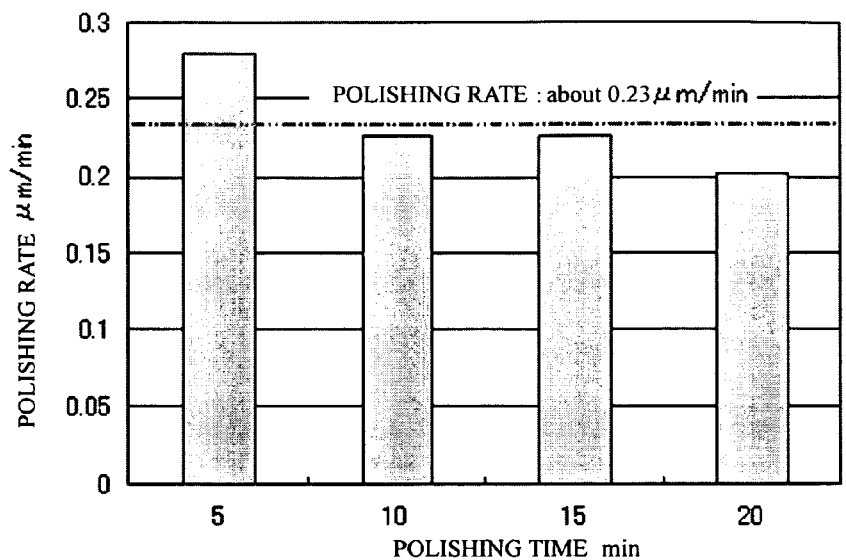
FIG. 6 is a graph showing a relationship between polishing time and polishing rate in the moderate polish process with the electrolytic reduced water.

FIG. 6 is a graph showing a relationship between polishing time and polishing rate in the moderate polish process with the electrolytic reduced water (electrolyte salt: NaCl). A silicon wafer was polished for 10 minutes with commercially produced polishing liquid (slurry) including abrasive grains so as to remove oxide film, and then the moderate polish process was performed. According to FIG. 6, after removing the oxide film, the polishing rate of the moderate polish process was almost constant, i.e., 0.2-0.28 μm/min.

TABLE 2 shows a relationship between the polishing time and surface roughness of silicon wafers, which were polished with various types of polishing liquids.

TABLE 2

| POLISHING CONDITION | CENTER | | RADIAL DIRECTION | | |
|---|---|---|---|---|---|
| | Ra (nm) | Rms (nm) | Ra (nm) | Rms (nm) | Rmax |
| SLURRY (10 min.) | 0.83 | 1.05 | 0.87 | 1.09 | 9.564 |
| SLURRY (10 min.) + ELECTROLYTIC REDUCED WATER (5 min.) | 0.59 | 0.74 | 0.65 | 0.82 | 6.503 |
| SLURRY (10 min.) + ELECTROLYTIC REDUCED WATER (10 min.) | 0.57 | 0.72 | 0.55 | 0.68 | 5.450 |
| SLURRY (10 min.) + ELECTROLYTIC REDUCED WATER (15 min.) | 0.55 | 0.70 | 0.57 | 0.71 | 5.620 |
| SLURRY (10 min.) + ELECTROLYTIC REDUCED WATER (20 min.) | 0.64 | 0.80 | 0.64 | 0.82 | 8.028 |

According to TABLE 2, the surface roughness of the silicon wafers, which were moderately polished with the electrolytic reduced water, were less than that of the silicon wafer, which was moderately polished with the commercially produced slurry. Namely, the electrolytic reduced water is suitable for the moderate and finishing polish processes.

Figure 7:
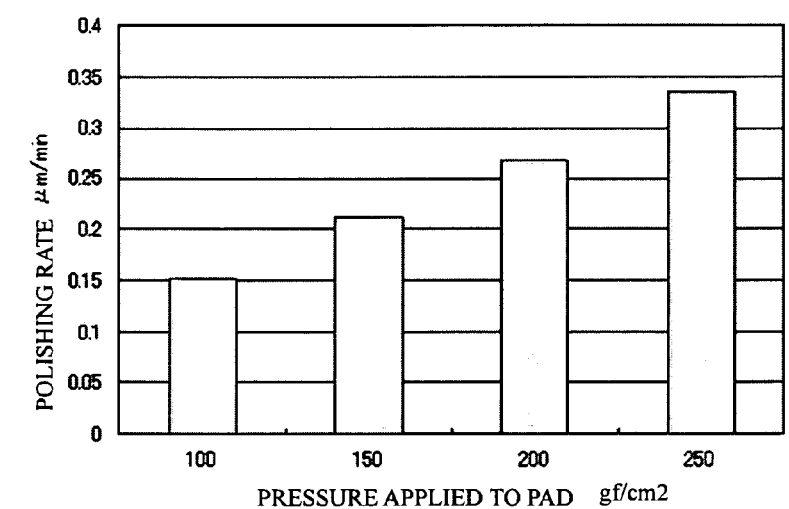
FIG. 7 is a graph showing a relationship between pressing force applied to a polishing pad and polishing rate in the moderate polish process.

FIG. 7 is a graph showing a relationship between pressing force (pressure) applied to the polishing pad 13 via a silicon wafer, from which oxide film was removed, and polishing rate in the moderate polish process. Flow volume of the electrolytic reduced water (electrolyte salt: NaCl) was 100 ml/min. The polishing rate was increased in proportion to the pressing force applied to the polishing pad 13.

Figure 8:
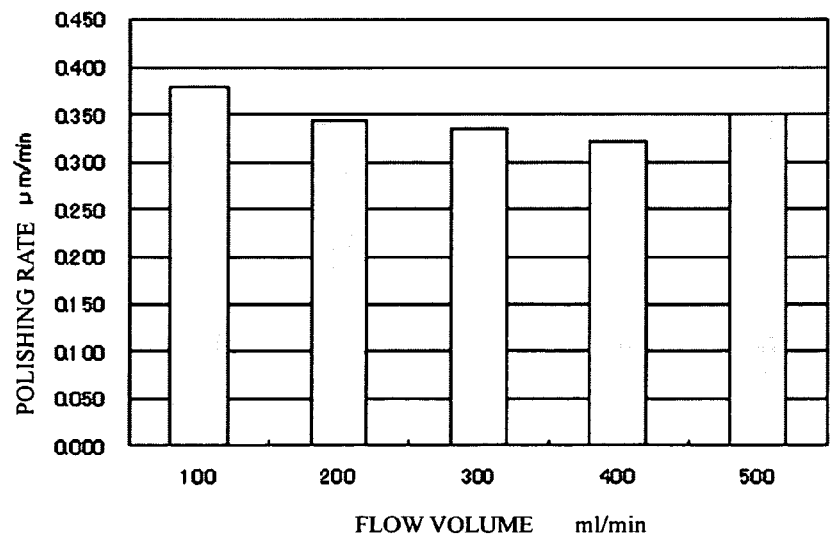
FIG. 8 is a graph showing a relationship between flow volume of the electrolytic reduced water and polishing rate in the moderate polish process.

FIG. 8 is a graph showing a relationship between flow volume of the electrolytic reduced water (electrolyte salt: NaCl), whose flow volume was 100-500 ml/min., and polishing rate in the moderate polish process. A pressing force (pressure) applied to a silicon wafer was constant, e.g., 200 $gf/cm^2$. The polishing rate was almost constant without reference to the flow volume of the electrolytic reduced water.

Figure 9:
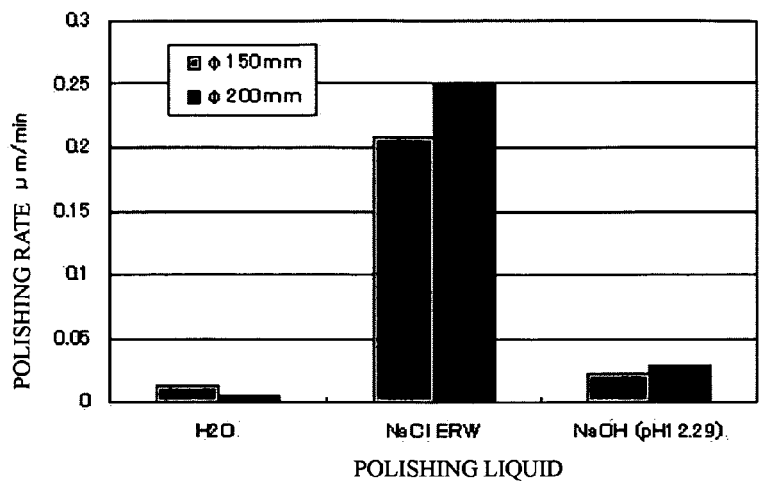
FIG. 9 is a graph showing polishing rate, in the moderate polish process, after removing oxide film by hydrogen fluoride (HF)

FIG. 9 is a graph showing polishing rate, in the moderate polish process. After removing oxide films formed on surfaces of silicon wafers by hydrogen fluoride (HF), the silicon wafers were polished with ordinary water, the electrolytic reduced water (electrolyte salt: NaCl) and a NaOH aqueous solution (pH: 12.29) respectively. According to FIG. 9, polishing rate of the water and the NaOH aqueous solution are very low, so they cannot be practically used as polishing liquid. Note that, in FIG. 9, "NaCl ERW" is said electrolytic reduced water.

Further, the silicon wafer was moderately polished, with the electrolytic reduced water (electrolyte salt: NaCl), for four hours after removing the oxide film by hydrogen fluoride (HF), and polishing rate and surface roughness were measured every one hour. The measured data were almost constant, and clogging the polishing pad was not occurred with the electrolytic reduced water.

Figure 10:
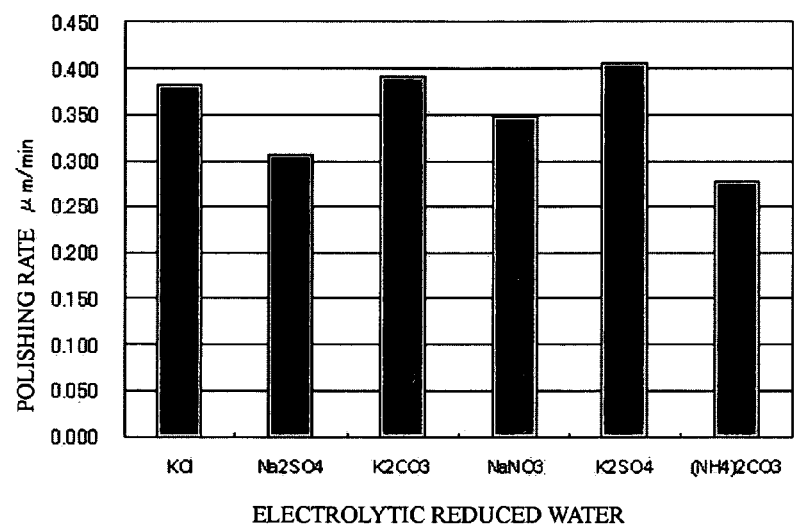
FIG. 10 is a graph of polishing rates in the moderate polish process, wherein various kinds of electrolytic reduced waters including various electrolyte salts are used as electrolyte solutions.

FIG. 10 is a graph of polishing rates in the moderate polish process. Various kinds of electrolytic reduced waters including electrolyte salts ($KCl$, $Na_2SO_4$, $K_2CO_3$, $NaNO_3$, $K_2SO_4$, $(NH_4)_2CO_3$) other than NaCl were used for moderately polishing silicon wafers, from which oxide films had been removed. The polishing rates of all of the electrolytic reduced waters were suitable for the moderate and precise polish processes.

In the above described examples, the silicon wafers were moderately polished. Next, the precise polish process (finishing polish process) with the electrolytic reduced water will be explained.

Figure 11:
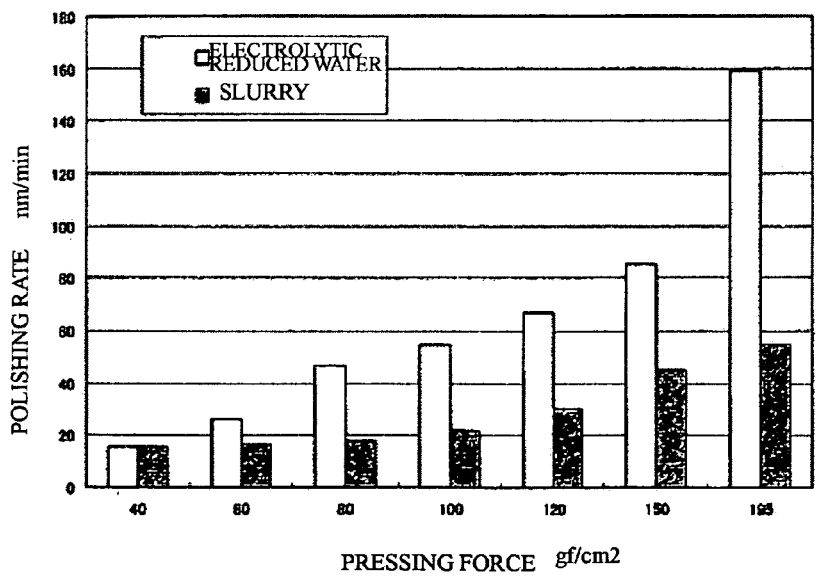
FIG. 11 is a graph showing a relationship between pressing force and polishing rate in a finishing polish process.

FIG. 11 is a graph showing a relationship between pressing force and polishing rate in the finishing polish process. Silicon wafers were precisely polished with the electrolytic reduced water and commercially produced slurry (GLANZOX3900RS). According to FIG. 11, the polishing rates of the both were made higher with increasing the pressing forces. When an ordinary pressing force, e.g., 80-120 $gf/cm^2$, was applied, the polishing rate of the electrolytic reduced water was about 2-2.5 times as high as that of the slurry.

Note that, the polishing rate of the finishing polish process was lower than that of the moderate polish process. In case of using the electrolytic reduced water, the surface of the silicon wafer had been already moderately polished, so that almost all of asperities in the surface were removed before the finishing polish process. Therefore, the polishing rate of the finishing polish process was lower. On the other hand, in case of using the commercially produced slurry, abrasive grains for the finishing polish process, whose grain diameters were smaller than those of abrasive grains for the moderate polish process, were included, so that the polishing rate was lowered.

In case of roughly and moderately polishing silicon wafers, the polishing rate of the commercially produced slurry was slightly higher than that of the electrolytic reduced water. However, as shown in FIG. 11, the polishing rate of the electrolytic reduced water was increased more than that of the commercially produced slurry in the finishing polish process.

Note that, details of the commercially produced slurry are as follows:
the manufacturer is Fujimi Inc. Japan;
the trade name is GLANZOX3900RS;
main component is $SiO_2$ colloidal (concentration of $SiO_2$ in a concentrate solution was 9.1 vol %);
a pH value is 10.5;
use application is for the finishing polish; and
dilution rate (slurry/water) for use is 10 wt %.

Figure 12:
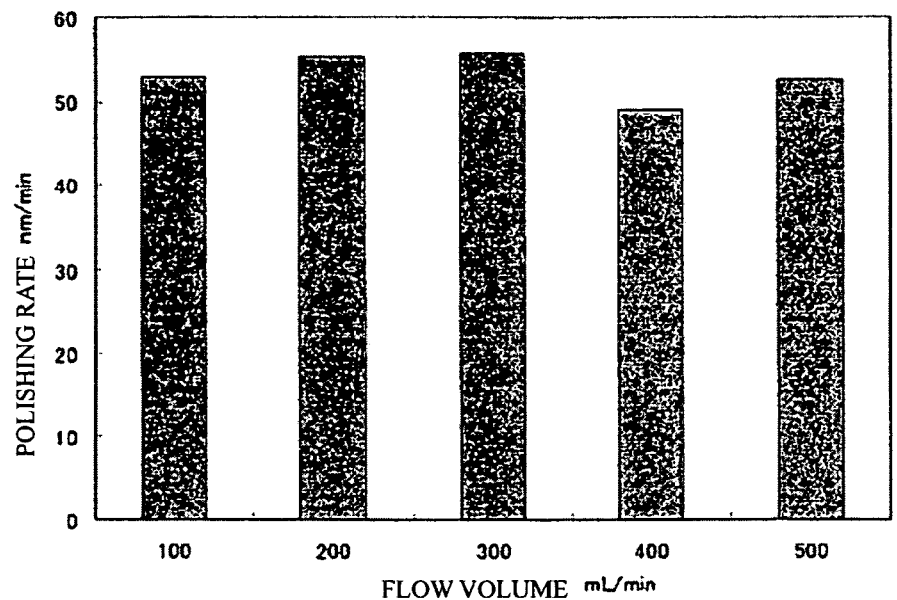
FIG. 12 is a graph showing a relationship between flow volume of the electrolytic reduced water and polishing rate in the finishing polish process.

FIG. 12 is a graph showing a relationship between flow volume of the electrolytic reduced water and polishing rate in the finishing polish process. Note that, the pressing force (pressure) for polishing a silicon wafer was 100 $gf/cm^2$, and the polishing time was 30 minutes. According to FIG. 12, when the flow volume of the electrolytic reduced water was 100-500 ml/min., the polishing rate was almost constant without reference to the flow volume.

Figure 13:
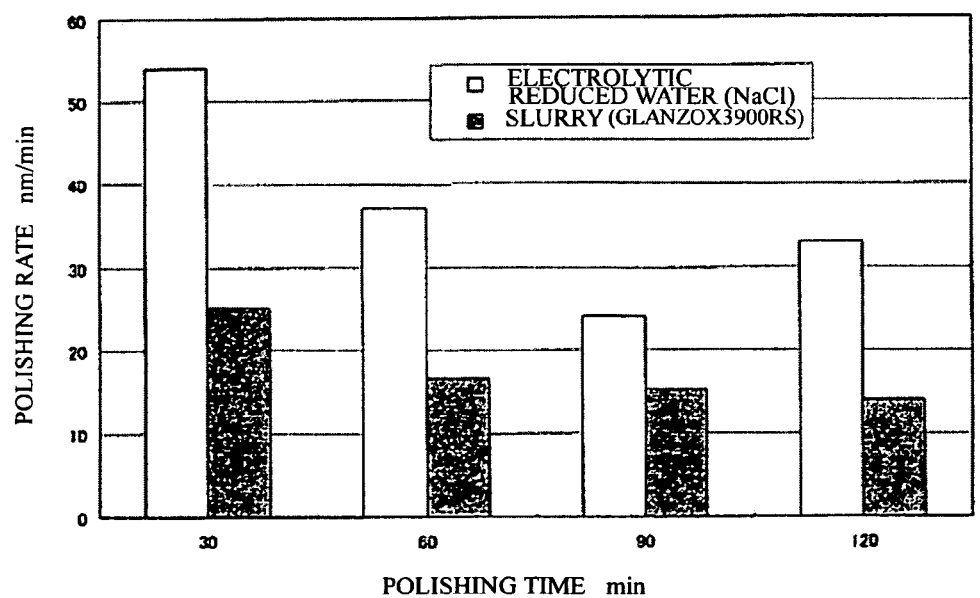
FIG. 13 is a graph showing a relationship between polishing time and polishing rate in the finishing polish process.

FIG. 13 is a graph showing a relationship between polishing time and polishing rate in the finishing polish process. Silicon wafers were precisely polished with the electrolytic reduced water and the commercially produced slurry (GLANZOX3900RS).

The pressing force was 100 $gf/cm^2$, and the silicon wafers were polished for 30, 60, 90 and 120 minutes. According to the results, the polishing rate of the electrolytic reduced water was made lower with extending the polishing time, as well as the commercially produced slurry, due to clogging of the polishing pad.

Figure 14A:
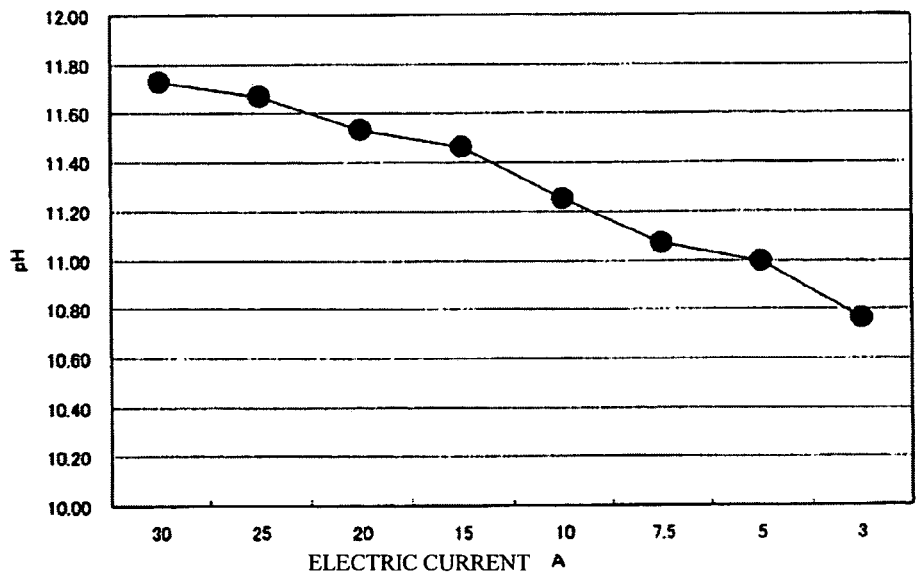
FIG. 14A is a graph showing a relationship between ampere value and pH of the electrolytic reduced water.
Figure 14B:
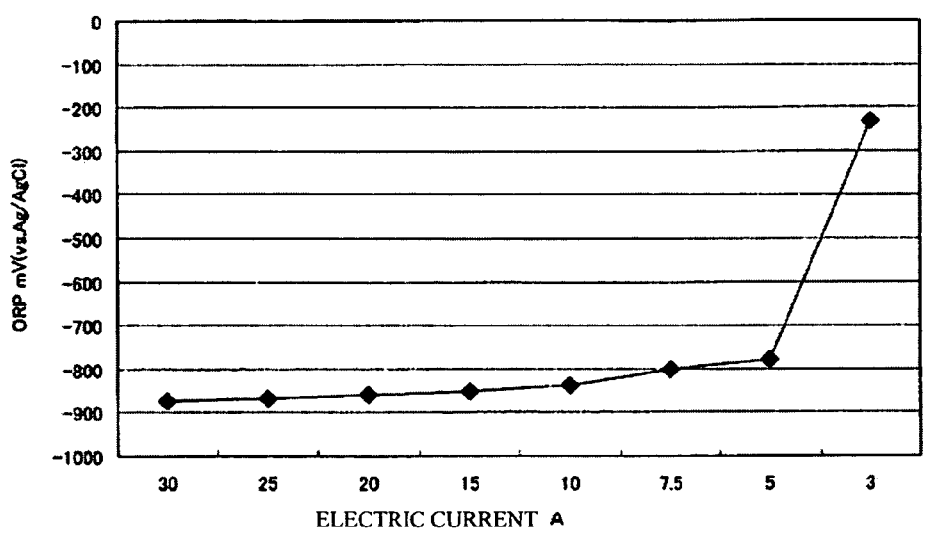
FIG. 14B is a graph showing a relationship between ampere value and ORP of the electrolytic reduced water.
Figure 15:
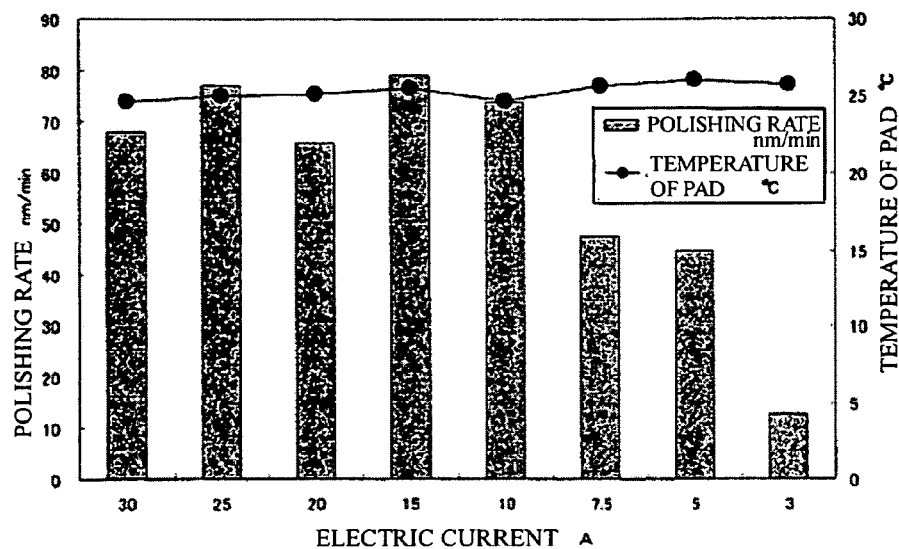
FIG. 15 is a graph showing a relationship between ampere value for producing the electrolytic reduced water and polishing rate.

FIG. 14A is a graph showing a relationship between ampere value and pH of the electrolytic reduced water, and FIG. 14B is a graph showing a relationship between ampere value and ORP of the electrolytic reduced water. Further, FIG. 15 is a graph showing a relationship between ampere value for producing the electrolytic reduced water and polishing rate. Note that, the pressing force was 100 $gf/cm^2$, the polishing time was 30 minutes and the flow volume of the electrolytic reduced water was 100 ml/min.

When the electrolytic reduced water was produced in the unit shown in FIG. 3 with applying an electric current of 10 A or more, the pH value of the electrolytic reduced water was 11.2 or more (see FIG. 14A), and the ORP with respect to the comparative electrode (silver-silver chloride electrode) was −800 mV or less (see FIG. 14B). By precisely polishing a silicon wafer with the electrolytic reduced water having said characteristics, high polishing rate, e.g., 65 nm/min. or more, could be gained. In each of the rough polish process, the moderate polish process and the finishing polish process, excellent polishing rates were gained when the ORP was −800 mV or less.

On the other hand, when the ORP was greater than −800 mV, the polishing rate was lowered.

Figure 16:
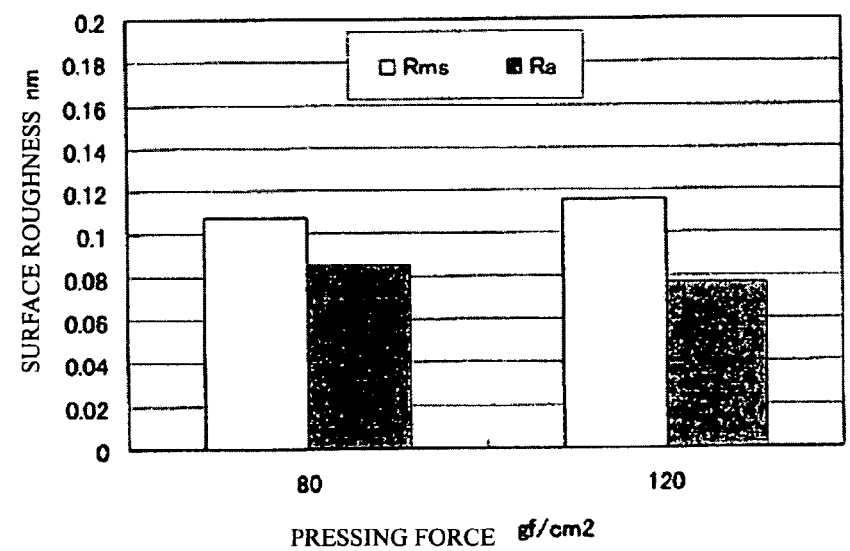
FIG. 16 is a graph showing a relationship between roughness of a finished surface and the pressing force.

FIG. 16 is a graph showing a relationship between roughness of a finished surface and the pressing force. According to FIG. 16, the surface roughness Rms of a silicon wafer was about 0.11 nm or less. The roughness was almost equal to surface roughness of a silicon wafer polished with the commercially produced slurry (0.2-0.3 nm). The surface roughness of the surface polished with the electrolytic reduced water was almost constant without reference to the pressing force or pressure.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:
1. A method of polishing a work, comprising the steps of:
pressing the work onto a polishing member; feeding polishing liquid; and relatively moving the work with respect to the polishing member, wherein the work is roughly polished at a beginning of a polishing step, moderately polished at a midpoint of the polishing step and precisely polished at a final stage of the polishing step, wherein the polishing liquid consists of only electrolytic reduced water, which is produced by electrolyzing an electrolyte solution, which has a power for etching the surface of the work, and which includes no abrasive particles, wherein oxidation-reduction poten- tial of the electrolytic reduced water is −800 to −900 mV with respect to a silver-silver chloride electrode used as a comparative electrode.

2. The method according to claim 1,
further comprising the step of removing an oxide film formed on a surface of the work,
wherein the work is polished with feeding the electrolytic reduced water as the polishing liquid after removing the oxide film.

3. The method according to claim 1,
wherein an electrolyzed water producing section continuously produces the electrolytic reduced water by electrolyzing the electrolyte solution and feeds the same as the polishing liquid.

4. The method according to claim 1,
further comprising the step of cleaning the polished work with washing water.

5. The method according to claim 4,
wherein the washing water is electrolytic oxidized water or the electrolytic reduced water produced by electrolyzing the electrolyte solution.

6. The method according to claim 5,
wherein an electrolyzed water producing section continuously produces the electrolytic oxidized water or the electrolytic reduced water by electrolyzing the electrolyte solution and feeds the same as the washing water.

7. The method according to claim 1,
wherein said method is used for polishing a surface of the work.

8. The method according to claim 1,
wherein said method is used for polishing an outer circumferential part and/or an inner circumferential part of the work.

9. The method according to claim 1,
wherein the work is a silicon wafer.

* * * * *